(12) United States Patent
Petruzzi

(10) Patent No.: US 8,577,782 B2
(45) Date of Patent: Nov. 5, 2013

(54) TRADING WITH CONDITIONAL OFFERS FOR SEMI-ANONYMOUS PARTICIPANTS

(76) Inventor: Christopher R. Petruzzi, San Clemente, CA (US)

( * ) Notice: Subject to any disclaimer, the term of this patent is extended or adjusted under 35 U.S.C. 154(b) by 0 days.

(21) Appl. No.: 12/756,929

(22) Filed: Apr. 8, 2010

(65) Prior Publication Data

US 2013/0066758 A1   Mar. 14, 2013

(51) Int. Cl.
*G06Q 40/00* (2012.01)
(52) U.S. Cl.
USPC .............................................. 705/37; 705/75
(58) Field of Classification Search
USPC ...................................... 705/37, 75
See application file for complete search history.

(56) References Cited

U.S. PATENT DOCUMENTS

| | | | |
|---|---|---|---|
| 5,497,317 A | 3/1996 | Hawkins | |
| 6,112,189 A | 8/2000 | Rickard | |
| 6,421,653 B1 | 7/2002 | May | |
| 7,113,924 B2 | 9/2006 | Fishbain | |
| 7,143,060 B2 | 11/2006 | Foster | |
| 7,412,415 B2 | 8/2008 | Waddell | |
| 7,752,123 B2 * | 7/2010 | Brookfield et al. | 705/37 |
| 7,778,920 B2 * | 8/2010 | Zarin et al. | 705/38 |
| 8,311,911 B2 * | 11/2012 | Tsagarakis et al. | 705/35 |
| 2001/0042036 A1 * | 11/2001 | Sanders | 705/36 |
| 2002/0004774 A1 | 1/2002 | Defarlo | |
| 2002/0087453 A1 | 7/2002 | Nicolaisen | |
| 2002/0087455 A1 * | 7/2002 | Tsagarakis et al. | 705/37 |
| 2002/0138418 A1 * | 9/2002 | Zarin et al. | 705/38 |
| 2005/0192888 A1 | 9/2005 | Lennane | |
| 2006/0229969 A1 | 10/2006 | Georgakopoulos | |
| 2007/0027795 A1 | 2/2007 | Claus | |
| 2010/0106578 A1 * | 4/2010 | Allio et al. | 705/14.15 |

* cited by examiner

*Primary Examiner* — James D Nigh
(74) *Attorney, Agent, or Firm* — Donald L. Wenskay

(57) ABSTRACT

According to one embodiment of the present invention, a method for generating conditional offers for semi-anonymous trading participants is provided. According to one embodiment of the present invention, a method comprises associating a trading entity with an identifier; acquiring trade history information including a history of trading transactions associated with said identifier; and receiving an offer from a Liquidity Provider based on said trade history information, said offer being only made to the trading entity associated with one of said identifiers.

32 Claims, 8 Drawing Sheets

TRADING WITH CONDITIONAL OFFERS FOR SEMI-ANONYMOUS PARTICIPANTS

BACKGROUND

The present invention relates to trading systems, and more specifically, to trading systems where conditional offers may be made by semi-anonymous participants.

The trading of stocks and other securities has become increasingly automated by electronic trading systems in recent years. On-line trading sites have furthered the convenience and speed of securities trading. These trends have brought an increasing anonymity, so that in many instances, buyers and sellers of securities typically will not know the identity of the parties they are trading with.

SUMMARY

According to one embodiment of the present invention, a method comprises: associating a trading entity with an identifier; acquiring trade history information including a history of trading transactions associated with said identifier; and receiving an offer from a Liquidity Provider based on said trade history information, said offer being only made to the trading entity associated with one of said identifiers.

According to another embodiment of the present invention, a method comprises: acquiring a history of trading transactions made by a taker, said taker being associated with an identifier; generating a profile of said taker; and generating an offer for a trade item based on said profile, said offer being only directed to the taker associated with said identifier.

According to a further embodiment of the present invention, a system comprises: a taker unit including a market order interface; an exchange unit including a trade history feed unit and a trade offer feed unit; a provider unit including a trade history profile database, a profile analyzer and an offer generator, wherein the profile analyzer generates a profile of a trading entity associated with an identifier based on a trade history in the trade history profile database, and wherein the offer generator generates an offer based on the output of the profile analyzer, the offer being associated with one of the identifiers; and the offer generator sending the offer to the trade offer feed unit, wherein the offer may only be accepted by the trading entity associated with the identifier.

According to another embodiment of the present invention, a computer program product for generating conditional offers for semi-anonymous trading participants comprises: a computer usable medium having computer usable program code embodied therewith, the computer usable program code comprising: computer usable program code configured to: associate a trading entity with an identifier; acquire trade history information including a history of trading transactions associated with said identifier; and receive an offer from a Liquidity Provider based on said trade history information, said offer being only made to the trading entity associated with one of said identifiers.

According to another embodiment of the present invention, a method comprises: associating a trading entity with an identifier; acquiring trade history information including a history of trading transactions associated with said identifier; generating a profile of said trading entity based on said history; and generating different offers for trading items to different trading entities based on the profile of individual trading entities.

According to another embodiment of the present invention, a method comprises: acquiring a history of trading transactions made by a taker, said taker being associated with an identifier; generating a profile of said taker; and generating an offer to an exchange to make a trade associated with said taker for a predetermined fee to be paid to said exchange.

DETAILED DESCRIPTION

Figure 1:
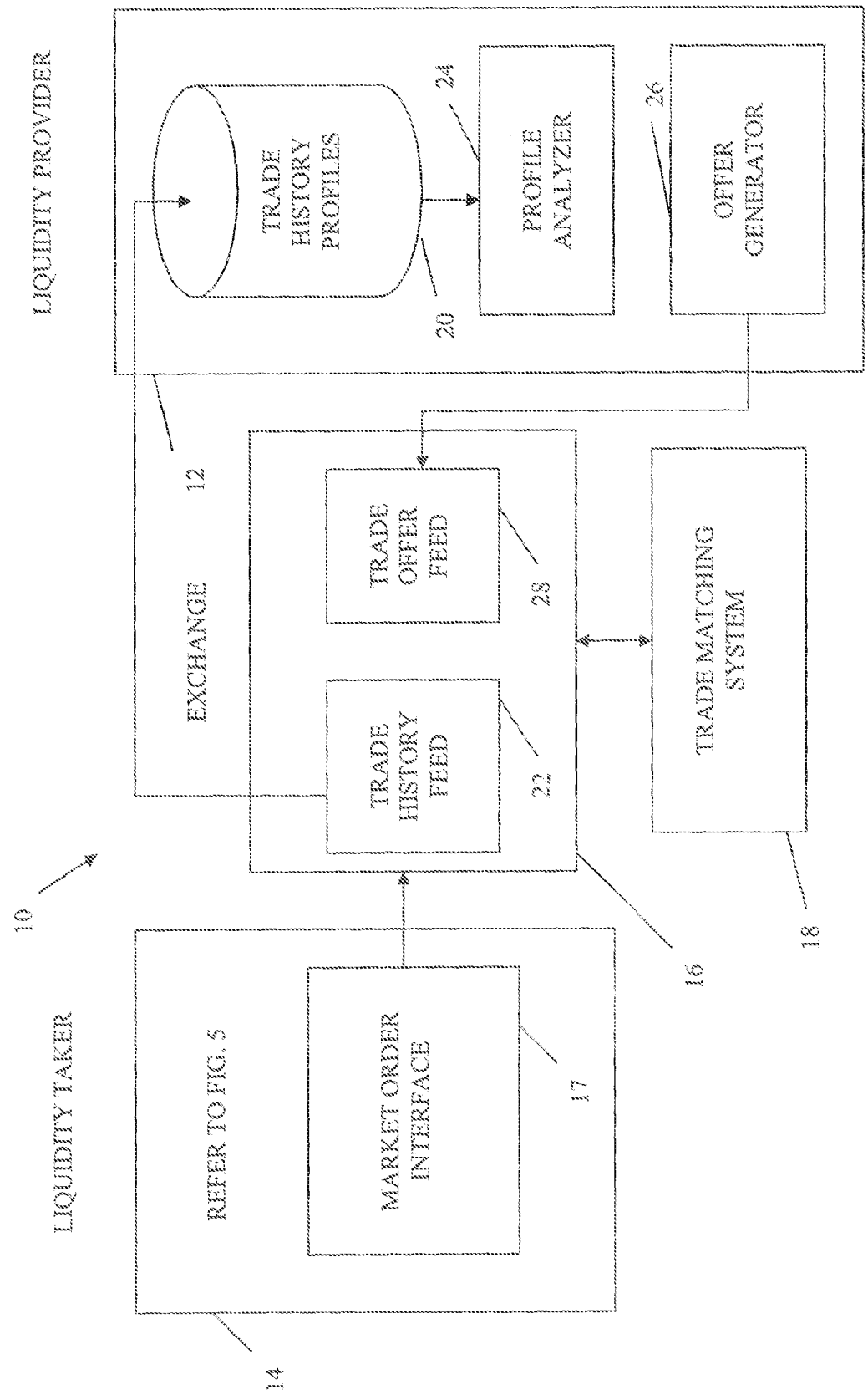
FIG. 1 shows a diagram of a trading system using a Liquidity Provider in accordance with an embodiment of the invention.

Embodiments of the invention provide systems, methods and computer program products for a variety of possible "trading items", defined here as including securities and futures contracts, using conditional offers for semi-anonymous participants. As used herein "providers" are defined as trading entities offering a trading item at a price, and "takers" are defined as trading entities with an offer to buy a trading item at a price. Collectively, providers and takers may be referred to herein as "participants" or "transacting parties".

Many modern trading systems are structured so that the identity of Takers and Providers is unknown to the other participant. Hence, Takers and Providers trade goods at prices that are established in a way that is unrelated to information about the transacting parties. The present inventor has recognized that it would be advantageous to both Takers and Providers if prices could be set based on some knowledge of the transacting parties. In particular, in some embodiments this knowledge may comprise information related to the trading history of the participant. Embodiments of the invention comprise techniques that enable informed, semi-anonymous, trading based on stored knowledge of the trading history of one or more of the participants, without revealing the exact identity of the trading parties.

For example, a profile of a Taker may be created based on an analysis of their trading history. As used herein, "trading history" means any relevant information relating to the trader, including information relating to the past trades of the trader, the identity of the trader, a classification of the trader, etc. This information may then be used by a Provider to offer different prices to different Takers as a function of their trading history. Takers can identify themselves by means of disposable profile identifiers that would relate each trade performed using the identifier with the profile. Takers can create one or more profile identifiers, or chose not to use any identifier. In the case where a Taker is using multiple identifiers trading profiles may only contain history of trades performed with the identifier used, such that from the perspective of Providers these profiles would represent separate trading entities. Takers will likely be motivated to use identifiers because trade history will generally provide opportunities for improved prices. In the absence of an identifier, a Provider may offer default pricing.

Providers can use trading profiles to generate conditional offers. The offers are conditional to the identity of the Taker, such that separate offers are generated for individual Taker identities. Each provider may use different algorithms enriched by their own data to generate offers, and may store trading profiles in their own database or storage device. Additionally Takers may enhance their trade profiles through the use of optional attributes that may provide further benefits for the creation and tracking of trading history. Attributes may, for instance, include a classification of the type of a trading entity.

A plurality of Providers may generate a plurality of trade offers for one or more items to be traded. Trade offers generated can be associated with identifiers for groups of Takers or individual Takers for which these offers are valid. Trade offers may include the identifiers for which the offers are valid and information packages, including both the offer and the identifiers associated with the offer, can be broadcast through an exchange. A trade matching system can match the best available offers with the trading entities for which those offers are valid, using the provided identifiers from both parties as part of the means of performing the match.

In some instances, a single trading entity can act either as a provider or a taker depending on the context of the trade. In this scenario the trading entity may use an identifier when acting as a Taker. This entity may also generate offers using the identifiers of other Takers as a basis for their offers.

Trading entities may also represent the trades of other entities such that one trading entity executes a number of trades on behalf of other trading entities, who may execute trades on behalf of other entities, and so on. Each trade may include identifiers for each of the trading entities involved in the trade such that trading profiles can be generated either for a singular entity involved in the trade or any of the aggregate entities involved. In this way, Providers can create profiles for any or all of the multiple entities that may be involved in a trade, and can generate offers specific either to individuals or aggregate entities. Individual trading entities may also use different aggregate entities for executing an offer.

In one embodiment, an individual trading entity may represent a person trading securities. An aggregate entity may represent a broker dealer trading on behalf of several individuals. Another entity may represent a clearing-house trading on behalf of a number of broker dealers. Each of these entities can use a separate identifier such that the history of trades associated with these entities can be associated with a profile that may be used by Providers to generate offers specific to an entity. In this embodiment, a Provider may generate an offer that is valid for any trades executed by a particular clearing-house, or for any trades executed by a particular broker dealer. Alternately, the provider may create offers that are particular to an individual. It is also possible that any of these entities may choose to execute trades through other entities. In these cases the entities could continue to use the same identifier used with the previous entity, with the new trading entity.

Offers to sell or offers to buy generated by Providers may be broadcast through a centralized exchange such that any number of Takers can subscribe to the offers broadcast through the exchange. Likewise, offers to sell or offers to buy generated by Takers may be broadcast through the centralized exchange such that any number of Providers can subscribe to the offers broadcast through the exchange. A trade tracking system may associate each trade with a profile identifier, if present, and broadcast offers through a trading exchange. Providers can retrieve and store broadcast trades that include identifiers to create locally stored profiles for trading parties. The trading profile analyzer (in one embodiment, located at the Liquidity Provider) retrieves profiles and applies algorithms to generate offers as a function of trading history.

Embodiments of the invention can create value by increasing trade volume, which results from greater pricing variability enabled through increased disclosure of trading entity identity. A marketplace with informed trading parties and increased transparency is expected to offer better price matching, resulting in greater deal flow.

FIG. 1 shows a diagram of a trading system 10 using a Liquidity Provider in accordance with an embodiment of the invention. In the trading system 10 trade offers can be generated as a function of trading profiles that may be stored by individual liquidity Providers. In particular, the trading system 10 includes a Liquidity Provider 12, a liquidity Taker 14 and a central exchange 16. A client market order interface 17 may comprise software that enables the liquidity Taker 14 to enter identifiers and attributes with an order. The central exchange 16 functions as an exchange through which all trade offers flow. A trade matching system 18 associates each trade with an identifier, if provided, and broadcasts this information to the exchange 16.

The liquidity Provider 12 includes a local database 20 that may store trader profiles as a function of trade history associated with previous trade offers. This trade history may be received from a trade history feed unit 22 in the exchange 16. The trade history feed unit 22 tracks the stream of trades that have been executed along with any associated identifiers, if present. The trade history feed unit 22 receives trade information and identifiers input through the market order interface 17.

A profile analyzer 24 may comprise software that can retrieve trader profile information from the local database 20 and apply algorithms to information useful for generating offers as a function of Taker history. For example, in one embodiment the profile analyzer 24 may compare the execution prices of an identified taker with the prices one minute later. The profile analyzer 24 would subtract the prices from one minute later from the execution prices which the identified taker received for a variable labeled DIFF. Then, the profile analyzer 24 would create a second variable, SIMPROF which was equal to the average of the negative of the value of DIFF for the cases in which the identified taker sold and the actual value of DIFF for the cases in which the identified taker bought. When SIMPROF was positive (indicating that there was a profit) and statistically significant, the offer generator 26 would make offers to sell to the identified taker at lower prices than the lowest quoted ask price on NASDAQ and buy from the identified taker at higher prices than the highest quoted bid price on NASDAQ.

In another embodiment, the profile analyzer 24 may also compare the actual profits which the Liquidity Provider earned from the transactions of an identified taker. The profile analyzer 24 would create a variable, ACTPROF which was equal to the actual profit which the Liquidity Provider earned from past cases in which the identified taker sold to or bought from the provider. When ACTPROF was positive and statistically significant, the offer generator 26 would make offers to sell to the identified taker at lower prices than the lowest quoted ask price on NASDAQ and buy from the identified taker at higher prices than the highest quoted bid price on NASDAQ.

An offer generator 26 uses the results from the profile analyzer 24 to generate offers based on Taker history. The offer generator 26 may then broadcast offers to the exchange 16 where they are received by a trade offer feed unit 28. The trade matching system 18 matches the best available trades between Takers and Providers by matching offers available against the identifier of offers from Liquidity Takers.

Figure 2:
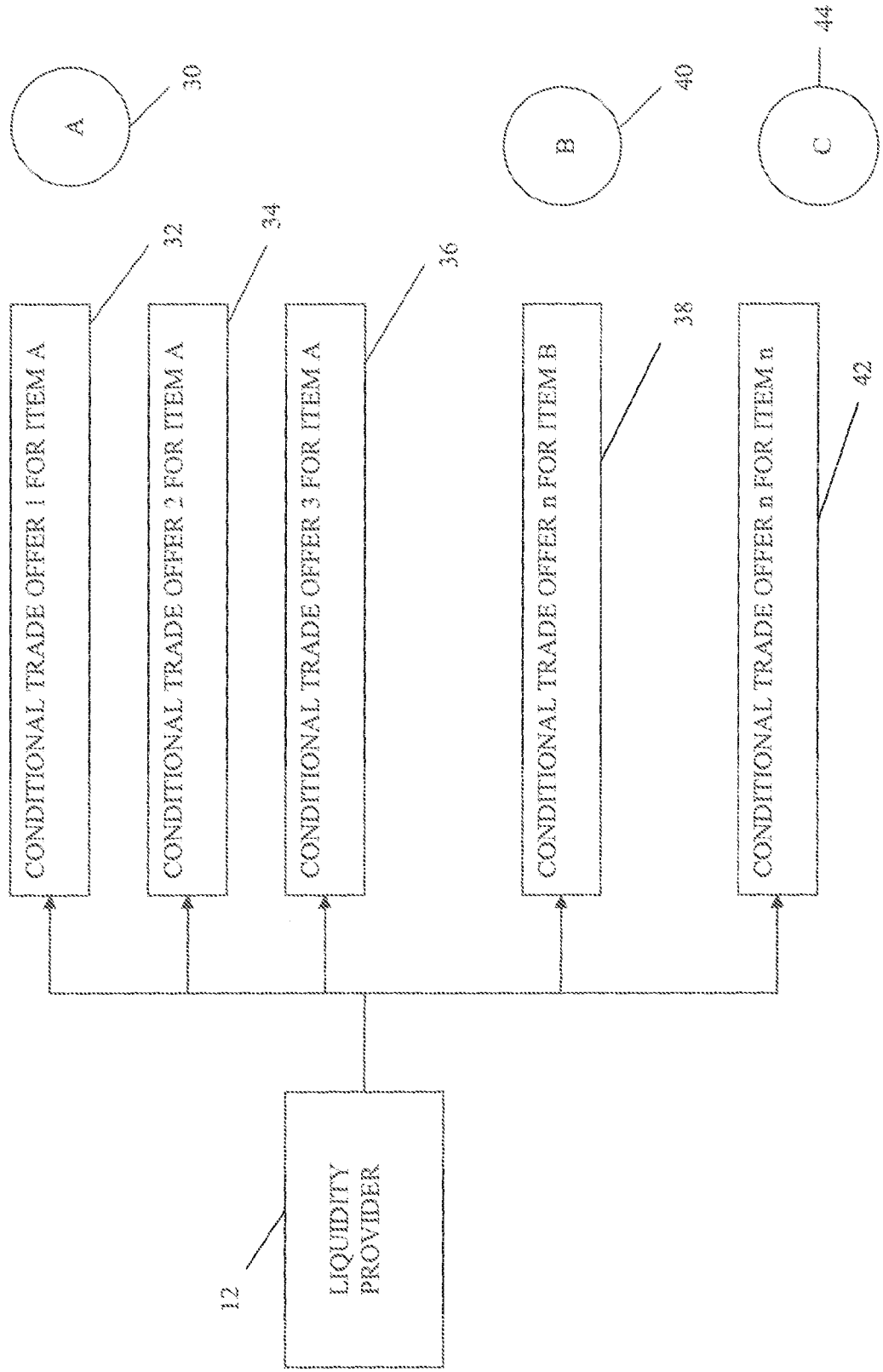
FIG. 2 shows a diagram of a process of generating a plurality of offers by a Liquidity Provider using the system shown in FIG. 1 in accordance with an embodiment of the invention.

FIG. 2 shows a diagram of a process of generating a plurality of offers by a Liquidity provider in accordance with an embodiment of the invention. A Liquidity Provider 12, such as the Liquidity Provider 12 shown in FIG. 1, can generate a plurality of trade offers for any item traded, where the different offers result from the offer generator 26. For example, for item A 30, a plurality of offers 36, 38 and 40, may be generated. Each offer 36, 38 and 40 can be specific either to a group of Liquidity Taker identifiers or can be for an individual Liquidity Taker identifier. Liquidity Provider 12 may also generate a plurality of offers for multiple trade items. For example, offers 32, 34 and 36 may be generated for trade item A, offer 38 may be generated for trade item B 38, and offer 42 may be generated for trade item C 44.

Figure 3:
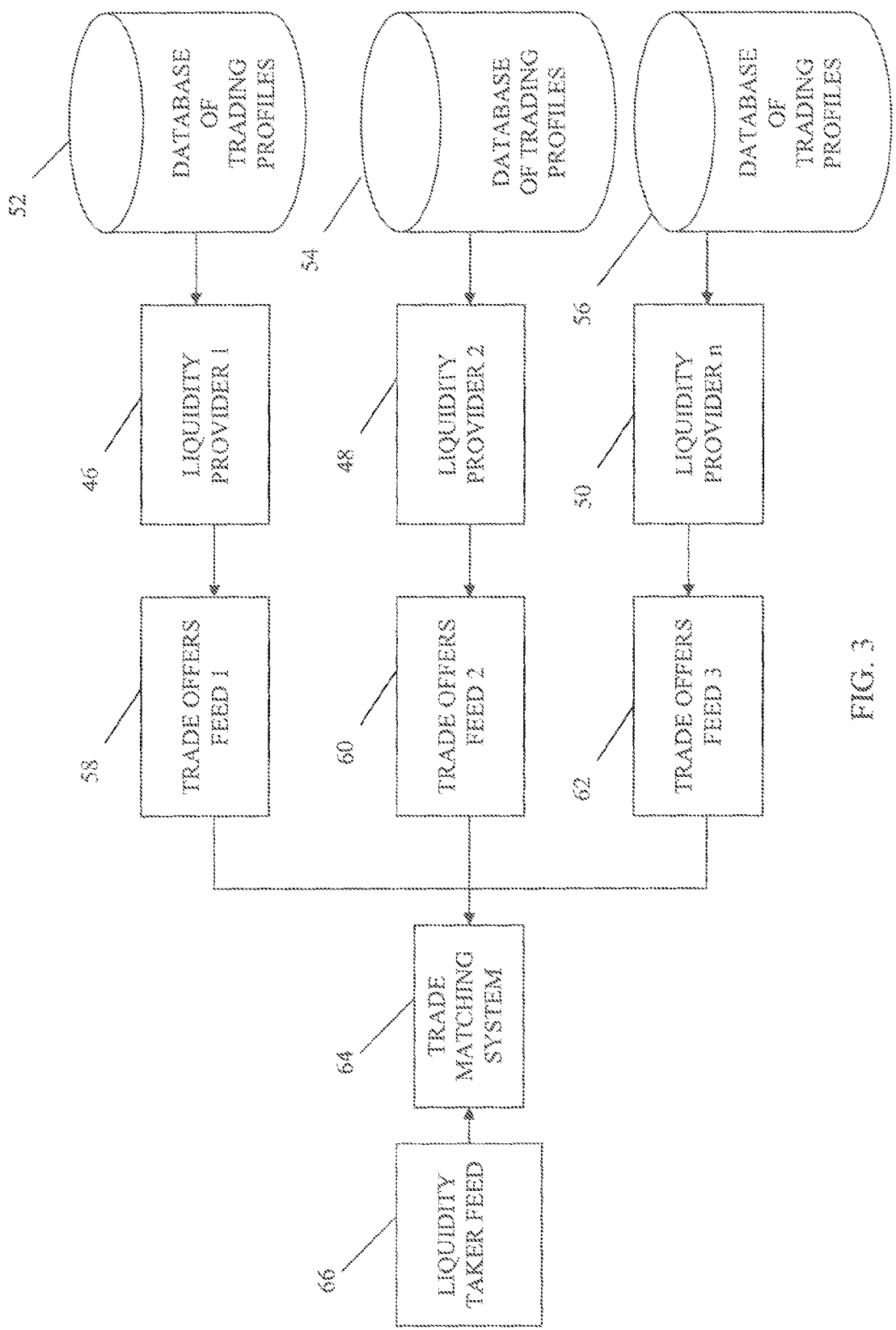
FIG. 3 shows a diagram of a portion of the trading system shown in FIG. 1 where the trading system has a plurality of Liquidity Providers in accordance with an embodiment of the invention.

FIG. 3 shows a diagram of a portion of the trading system shown in FIG. 1 having a plurality of Liquidity Providers in accordance with an embodiment of the invention FIG. 3. The plurality Liquidity Providers 46, 48 and 50 using the databases of trading profiles 52, 54, 56, can generate trade offers 58, 60, 62 for each trading profile. Trading profiles may be stored, tracked and analyzed independently by each Liquidity Provider. The offers generated are fed to a trading-exchange, such as trading-exchange 16 shown in FIG. 1, where the trade matching system 64 finds the best match between the trades offered and trades requested. The trade matching system 64 does this by using Taker identifiers, where present, to select trade offers specific to taker profiles represented by the identifier.

The Liquidity Taker feed unit 66 operates as follows. The Liquidity Taker's market order interface 17 will automatically show the identification of the Liquidity Taker through numerical, alphabetical, or other symbols. Hence, data with each order and each transaction will be given to the Liquidity Provider 12 through the trade history feed, showing the time, the price, the number of shares, the identification of the Liquidity Taker, and whether the taker was a buyer or a seller. The offer generator 26 will generate offers which are for the identified Liquidity Taker.

Figure 4:
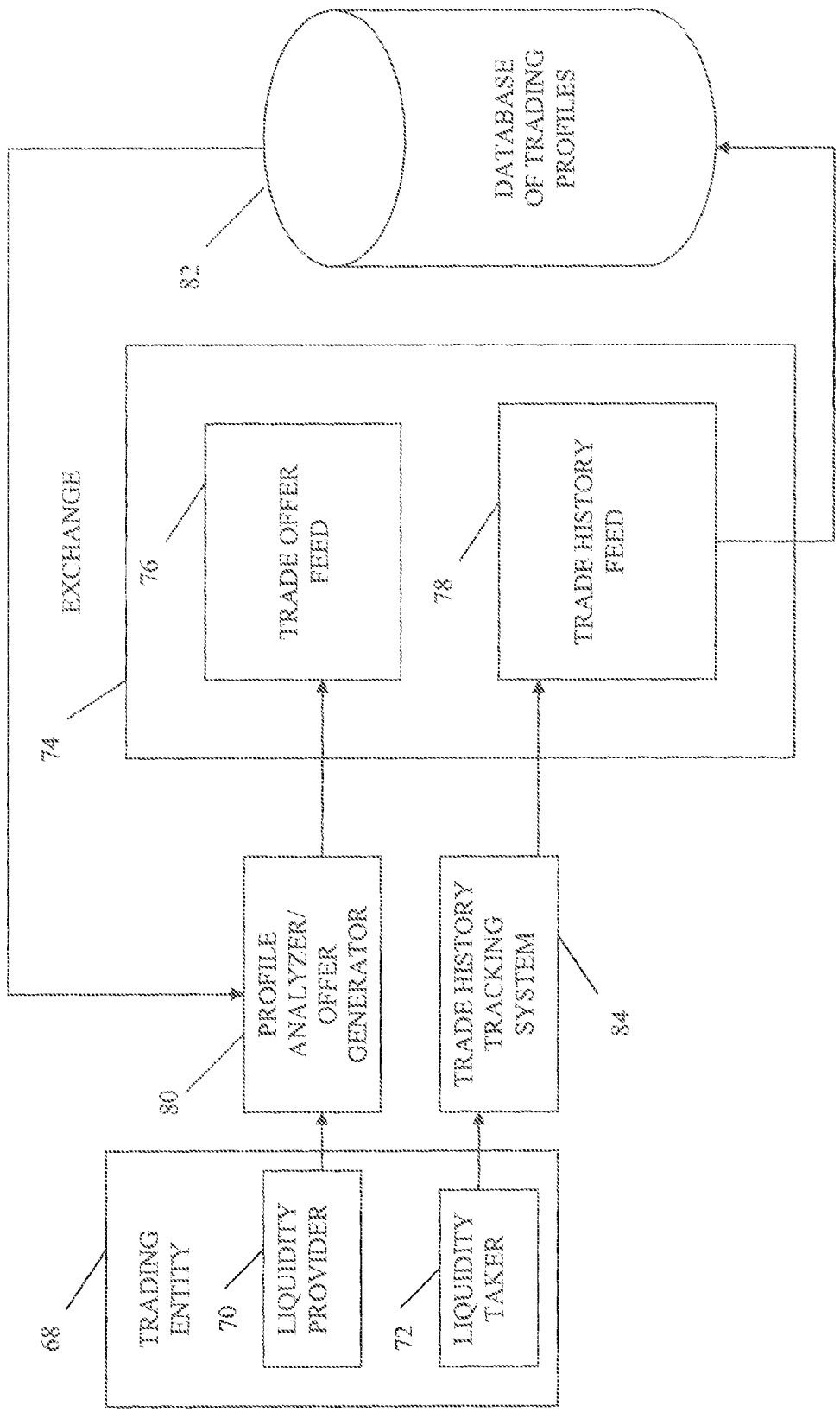
FIG. 4 shows a diagram of a trading entity, in the trading system shown in FIG. 1, in the roles of Liquidity Provider and Liquidity Taker in accordance with an embodiment of the invention.

FIG. 4 shows a diagram of a trading entity, in the trading system shown in FIG. 1, in the roles of Liquidity Provider and Liquidity Taker in accordance with an embodiment of the invention. A trading entity 68 may be either or both a Liquidity Provider 70 and a Liquidity Taker 72 based on transaction context. The Trading entity may use an identifier when acting as a Liquidity Taker, and can generate a plurality of trade offers in relation to identifiers for other Liquidity Takers when acting as a Liquidity Provider. The exchange 74, trade offer feed 76, trade history feed 78, profile analyzer/offer generator 80, trading profile database 82 and trade history tracking system 84 all operate in a manner similar to the similarly labeled components shown in FIG. 1.

Figure 5:
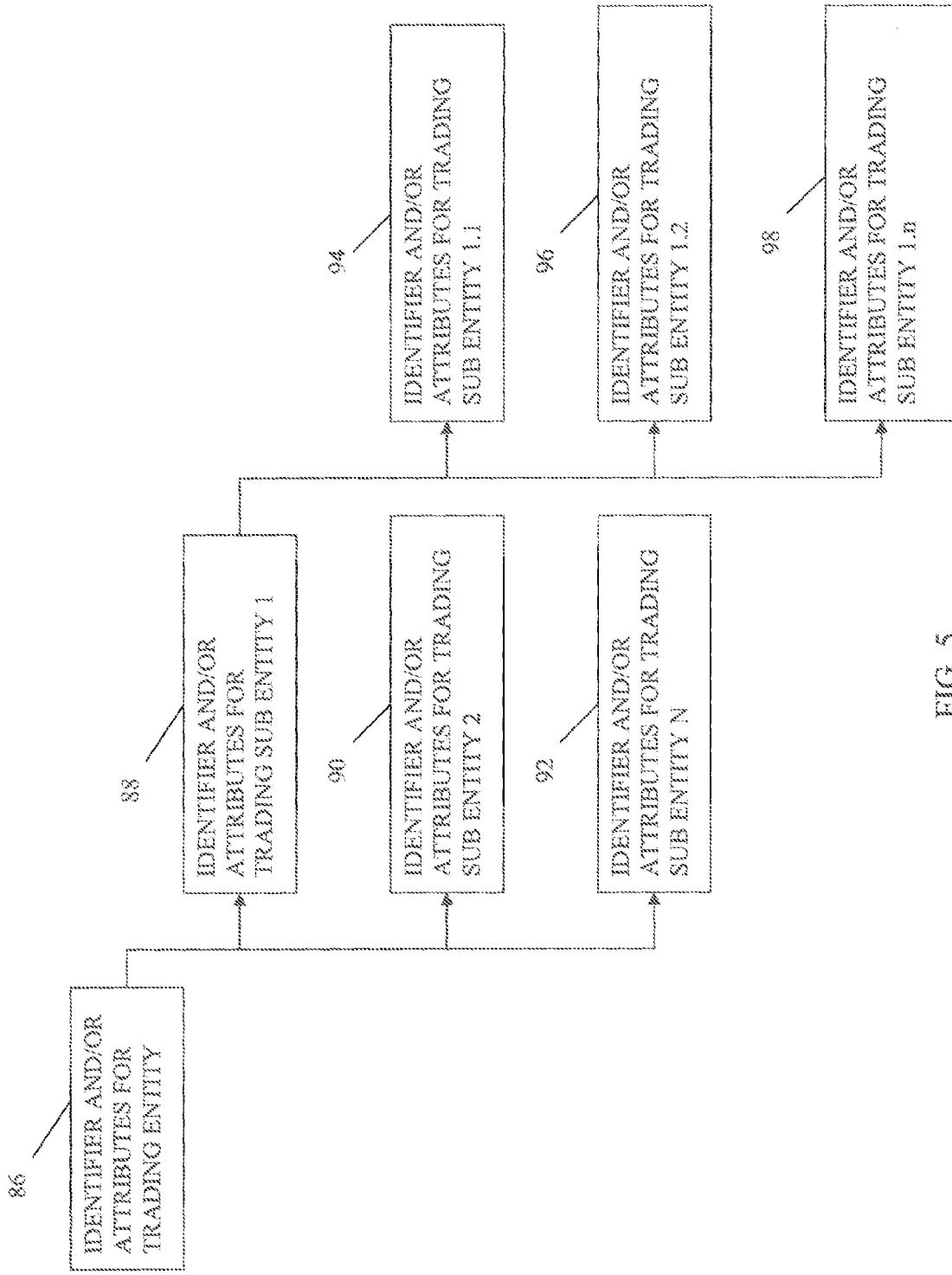
FIG. 5 shows a diagram of a trading system, such as the trading system shown in FIG. 1, having a hierarchy of multiple trading entities in accordance with an embodiment of the invention.

FIG. 5 shows a diagram of a trading system, such as the trading system shown in FIG. 1, having a hierarchy of multiple trading entities in accordance with an embodiment of the invention. In particular, trades may be executed hierarchically by multiple trading entities such that an entity 86 may represent a collection of offers from other trading sub-entities 88, 90, 92. Likewise, these sub-entities 88, 90, 92 may each represent a collection of offers from other sub-entities 94, 96 and 98. Embodiments of the invention can provide an identifier and optionally may provide attributes for each entity or sub-entity, down to singular trading entities. As such, trading profiles may be generated for any of the trading entities such that profiles may track the aggregate trades of higher-level entities, or the single trades of individual entities.

In one embodiment of the invention, the Liquidity Provider, such as Liquidity Provider 12 in FIG. 1, buys or sells stock (or other security) in a transaction with Liquidity Takers, such as liquidity Taker 14. At any given moment there is a bid/offer spread, which is the difference between the price quoted by a market maker for an immediate sale (bid) and an immediate purchase (ask). For a purchase and a sale the Liquidity Taker pays the bid/offer spread and the Liquidity Provider earns the bid/offer spread. With most traders, sometimes referred to as "naive" traders (Liquidity Takers), the Liquidity Provider can rely on this spread to provide a predictable and acceptable profit. The stock will sometimes go up and sometimes go down in the moments between trades and the losses and gains due to these very short term fluctuations in the price of stock will cancel each other out.

However, there is a class of trader known as "toxic traders", who appear to consistently have special knowledge about the direction of the price of a stock. For purposes of this discussion, we are not concerned with how toxic traders have obtained such knowledge. With such traders, it can be expected that, more often than not, the price of shares of stock they are selling will usually drop shortly after they sell the stock, and the price of shares of stock they are buying will usually go up shortly after they buy it. As a result, Liquidity Providers will make less than the bid/offer spread when dealing with toxic traders. Liquidity providers will usually not know if they are dealing with a toxic trader in any individual transaction. To make up for losses caused by toxic traders, Liquidity Providers may increase the bid/ask spread, resulting a slightly higher fee for all traders.

In accordance with this embodiment of the invention, information regarding the trading history of a Liquidity Taker, such as contained in the trading history profiles 20 shown in FIG. 1, may be used with the profile analyzer 24 to identify toxic traders. This will enable the Liquidity Provider to use the offer generator 26 to adjust prices accordingly, for example, by charging the toxic traders a higher bid/ask spread than the naïve trader. This benefits the Liquidity Provider because they can adjust their prices to reduce the losses caused by toxic traders. The naïve trader benefits because they do not have to pay higher prices to make up for the losses caused by toxic traders.

In accordance with another embodiment of the invention, instead of the Liquidity Provider 12 providing different offers for an item based on the profile of the liquidity Taker 14, the exchange 16 will give different quotes and transaction prices to different takers based on the takers' profiles.

In another embodiment of the invention, instead of adjusting the price of the security based on the profile of the taker, the exchange may offer different fees and rebates based on the taker profiles. Note that SEC mandated that exchanges make all quotes (and transactions) in full cents. Hence, a Liquidity Provider cannot legally compete by offering a fraction of a cent more to buy or less when selling. Currently, all exchanges charge fees to Liquidity Takers, typically about three tenths of a cent ($0.003). The exchanges also pay rebates to Liquidity Providers (usually $0.002 and higher). The exchanges compete among each other by varying those fees and rebates.

In accordance with an embodiment of the invention, the exchange may let Liquidity Providers compete for the order flow of naïve Liquidity Takers by offering to receive lower rebates. The exchanges could then compensate the Liquidity Takers of naïve order flow by charging lower fees for them to take liquidity with the fees adjusted lower by some portion of the decrement in the fee paid to the Liquidity Provider. This may, or may not, be done automatically.

Figure 6:
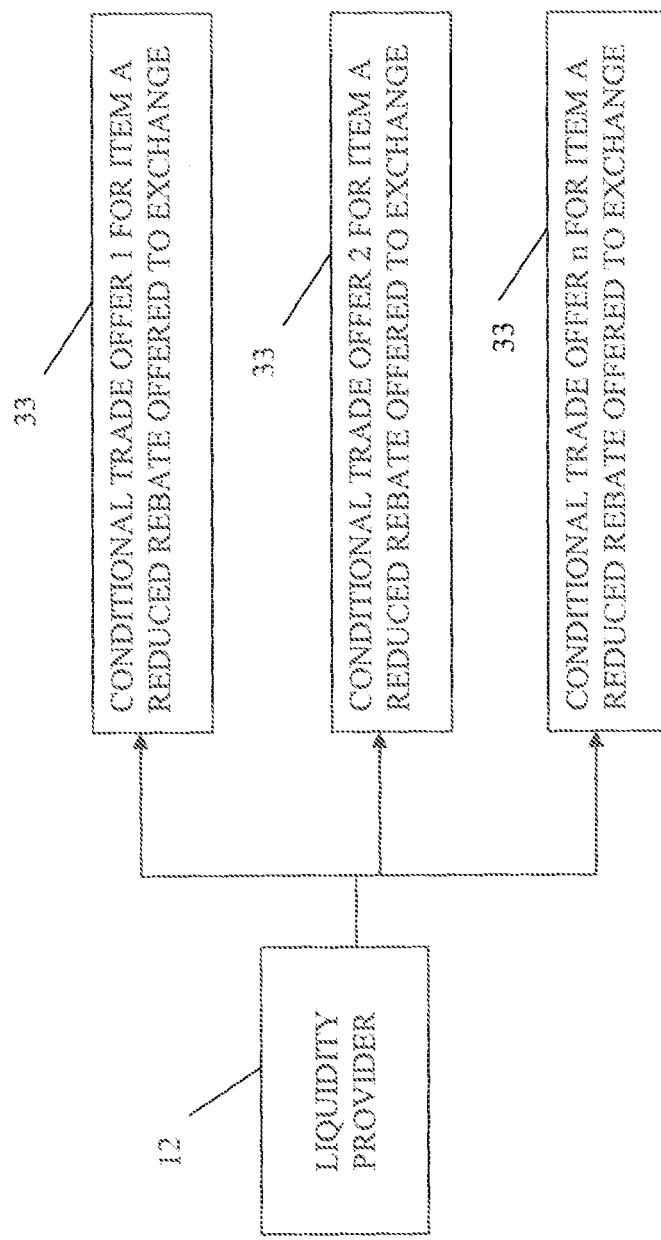
FIG. 6 shows a diagram of a process of generating a plurality of offers by a Liquidity Providers using the system shown in FIG. 1 in accordance with an embodiment of the invention.
Figure 7:
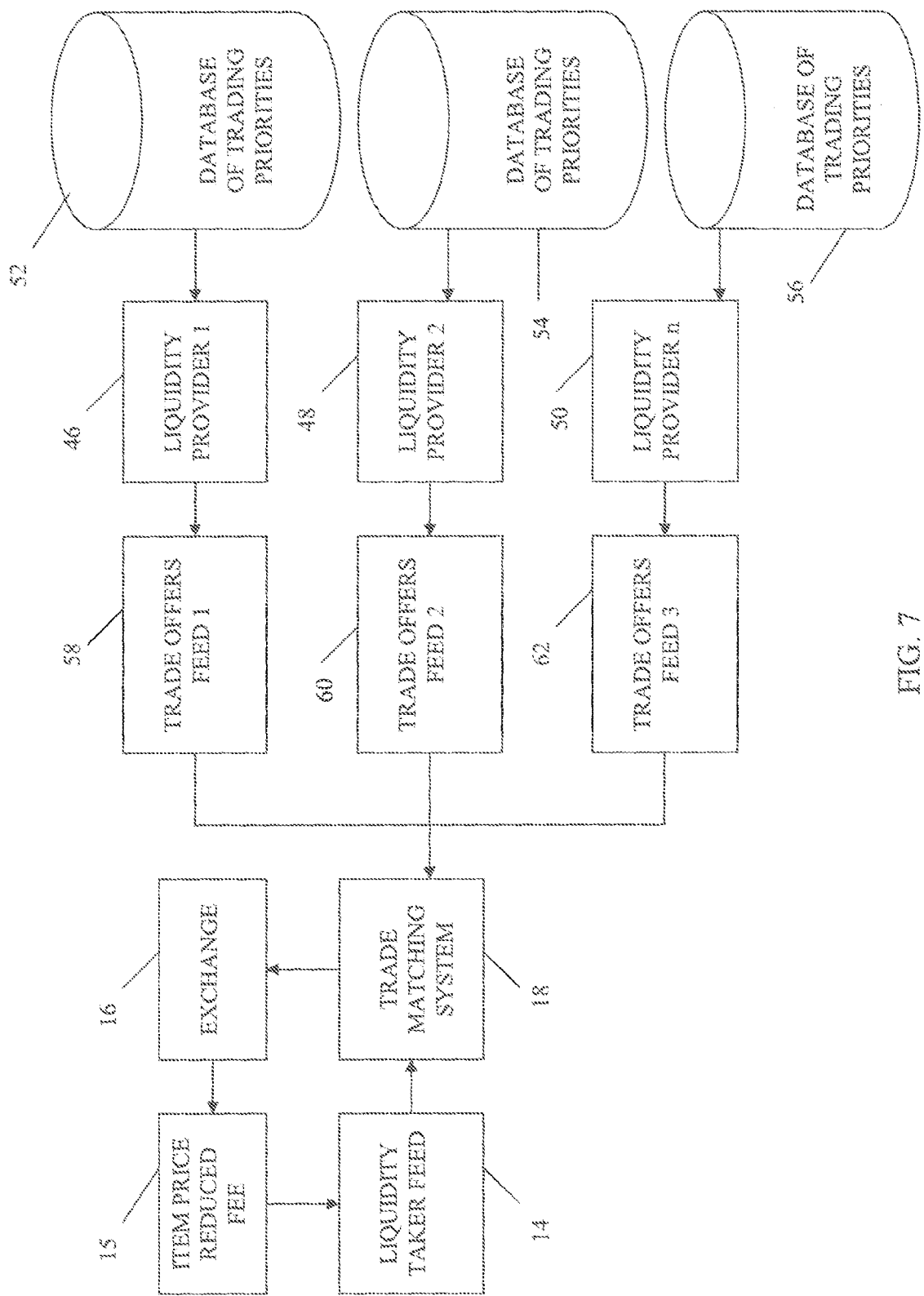
FIG. 7 shows a diagram of a portion of the trading system shown in FIG. 1 where the trading system has a plurality of Liquidity Providers in accordance with an embodiment of the invention.

For example, the Liquidity Providers may offer to accept lower rebates (or to pay higher charges for accessing the exchange) for transactions involving naive Liquidity Takers. Alternatively, the exchange may offer higher rebates (or accept lower charges for accessing the exchange) to identified naive Liquidity Takers with the higher rebates (or lower charges) calculated as some function of the higher fees offered by the Liquidity Providers. Referring now to FIG. 6 a diagram is shown where a Liquidity Provider 12 generates multiple conditional trade offers for the securities, as in FIG. 2, and additionally its offer generator 26 generates the amount of reduced rebate offered to the exchange as shown at 33. FIG. 7 shows two data items 15 going to the Liquidity Taker 14—the price for the item and the reduction in the fee charged by the exchange.

As can be seen from the above disclosure, embodiments of the invention provide techniques for trading with conditional offers for semi-anonymous participants. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. Other examples of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, and/or RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on one or more user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
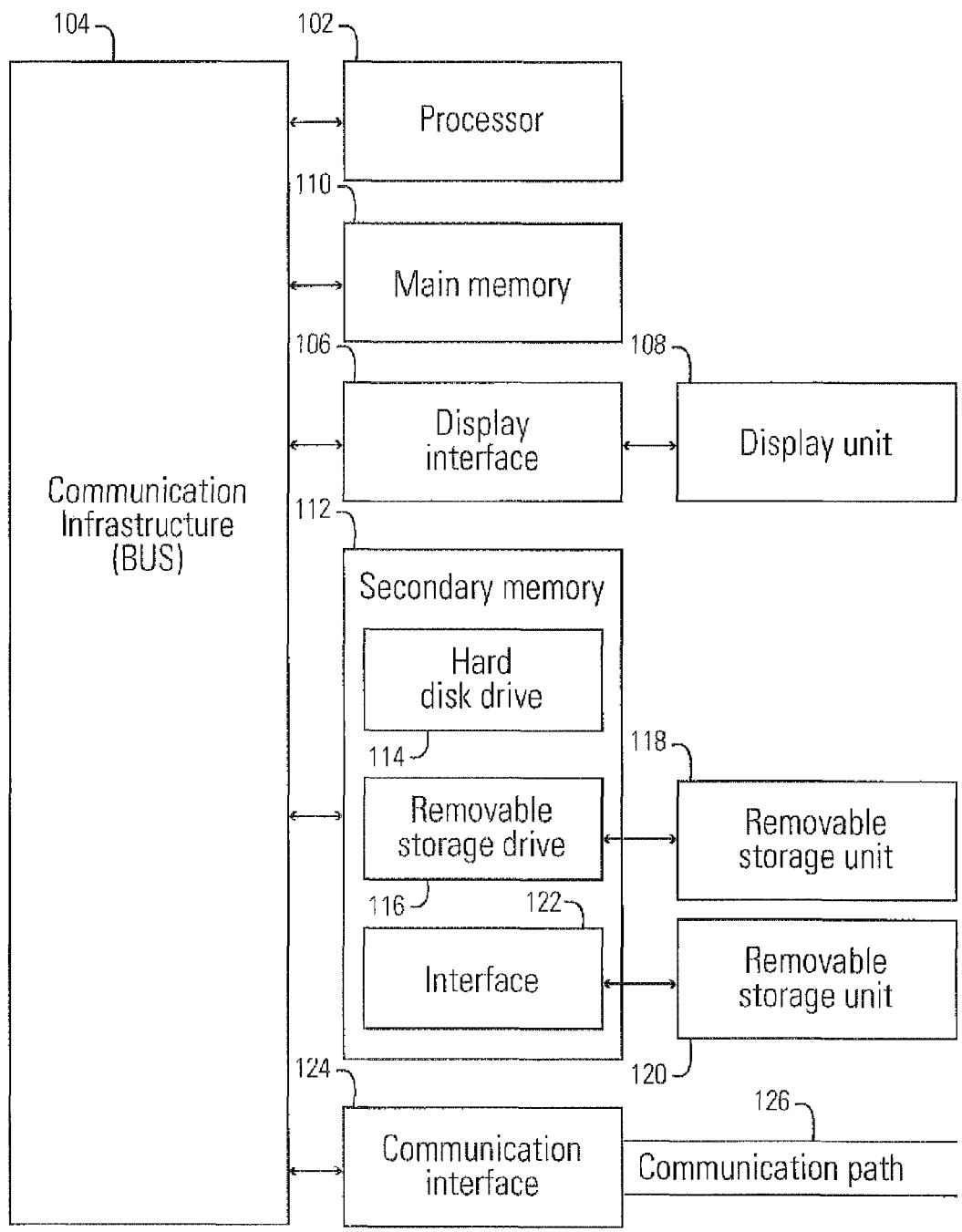
FIG. 8 shows a high level block diagram of an information processing system useful for implementing one embodiment of the present invention.

FIG. 8 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular are not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   associating one of a plurality of trading entities with an identifier using a processor implemented at least partly in hardware;
   acquiring trade history information including a history of trading transactions associated with said identifier using a processor implemented at least partly in hardware; and
   receiving an offer to buy or to sell a trading item from a liquidity provider based on a profile generated from said trade history information, the profile containing information that indicates whether said trading transactions associated with said trading entity would generate a profit, using a processor implemented at least partly in hardware, said offer being only made to said trading entity associated with said identifier, said offer being processed through an exchange that processes trading transactions for items having a bid/offer spread.

2. The method according to claim 1 wherein said identifier is associated with the trade history information of a trading entity but does not reveal the personal or institutional identity of any particular trading entity.

3. The method according to claim 1 further comprising matching said offer with at least one trading entity.

4. The method according to claim 1 wherein said step of receiving an offer comprises receiving a bid/ask offer.

5. The method according to claim 1 wherein said step of acquiring trade history information comprises acquiring trade history information including a history of trading transactions that occurred within an exchange.

6. The method according to claim 1 wherein said step of receiving an offer comprises receiving an offer through a securities exchange or a futures exchange.

7. The method according to claim 5 wherein said step of acquiring trade history information comprises trade history information that is available through the exchange.

8. The method according to claim 1 wherein said step of acquiring trade history information comprises acquiring information on the prices of a trading item at a predetermined period of time after a trading transaction.

9. The method according to claim 1 further comprising transferring said trade history information to a liquidity provider.

10. A method comprising:
acquiring a history of trading transactions made by one of a plurality of takers using a processor implemented at least partly in hardware, said taker being associated with an identifier;
generating a profile of said taker using a processor implemented at least partly in hardware, said profile including trade history information that indicates whether said trading transactions made by said taker would generate a profit; and
generating an offer to buy or to sell a trading item for a trade item based on said profile using a processor implemented at least partly in hardware, said offer being only directed to said taker associated with said identifier, said offer being processed through an exchange that processes trading transactions for items having a bid/offer spread.

11. The method according to claim 10 further comprising storing said history in a database.

12. The method according to claim 10 wherein said step of generating a conditional offer comprises generating a bid/ask offer.

13. The method according to claim 10 wherein said step of acquiring a history of trading transactions comprises acquiring a history of trading transactions that occurred within an exchange.

14. The method according to claim 10 wherein said step of generating an offer comprises generating an offer through a securities exchange or a futures exchange.

15. A system comprising:
a taker unit including a market order interface device implemented at least partly in hardware;
an exchange system implemented at least partly in hardware, the exchange system processing trading transactions for items having a bid/offer spread including a trade history feed unit and a trade offer feed unit;
a provider unit including a trade history profile database device implemented at least partly in hardware, wherein, said trade history profile database device including a profile of one of a plurality of trading entities, the one trading entity being associated with an identifier based on a trade history, said trade history profile containing information that indicates whether trading transactions associated with said trading entity would generate a profit, and
an offer generator, wherein said offer generator generates an offer to buy or to sell a trading item based on said profile, said offer being associated with said identifier; and
said offer generator sending said offer to said trade offer feed unit, wherein said offer may only be accepted by said trading entity associated with said identifier.

16. The system according to claim 15 further comprising a trade matching system coupled to said exchange system for finding matches between said offer and said trading entities.

17. The system according to claim 15 wherein said identifier is associated with the trade history information of a trading entity but does not reveal the personal or institutional identity of any particular trading entity.

18. The system according to claim 15 wherein said provider unit includes a profile analyzer for analyzing said profile to determine whether trading transactions associated with said trading entity generated a profit.

19. A computer program product for generating conditional offers for semi-anonymous trading participants, said computer program product comprising:
a non-transitory computer usable medium having computer usable program code embodied therewith, said computer usable program code comprising:
computer usable program code configured to:
associate one of a plurality of trading entities with an identifier;
acquire trade history information including a history of trading transactions associated with said identifier; and
receive an offer to buy or to sell a trading item from a liquidity provider based on a profile generated from said trade history information, said profile containing information that indicates whether trading transactions associated with said trading entity would generate a profit, said offer being only made to said trading entity associated with said identifier through an exchange that processes trading transactions for items having a bid/offer spread.

20. A method comprising:
associating a plurality of trading entities each with an identifier using a processor implemented at least partly in hardware;
acquiring trade history information including a histories of trading transactions associated with a plurality of said identifiers using a processor implemented at least partly in hardware;
generating profiles of said trading entities based on said histories, each said profile containing information that indicates whether trading transactions associated with a trading entity would generate a profit; and
generating different offers to buy or to sell a trading item to different trading entities based on the profiles of individual trading entities, the offer being processed through an exchange that processes trading transactions for items having a bid/offer spread, using a processor implemented at least partly in hardware.

21. The method according to claim 20 wherein said trading entity is a liquidity taker.

22. The method according to claim 20 wherein said step of generating different offers comprises:
   generating an offer to a first trading entity having a first fee and a first price; and
   generating another offer to a second trading entity having the first fee and a second price different from the first price.

23. The method according to claim 20 wherein said step of generating different offers comprises:
   generating an offer to a first trading entity having a first fee and a first price; and
   generating another offer to a second trading entity having a second fee different from the first fee and a first price.

24. The method according to claim 20 wherein said step of generating different offers comprises
   generating an offer to a first trading entity having a first fee and a first price; and
   generating another offer to a second trading entity having a second fee different from the first fee and a second price different from the first fee.

25. The method according to claim 23 further comprising conducting a bidding process by liquidity providers that results in said first and second fees.

26. The method according to claim 23 further comprising charging the first and second fees to liquidity takers.

27. The method according to claim 23 further comprising offering rebates to liquidity providers as part of said fees.

28. The method according to claim 20 wherein generating a profile comprises storing said trade history information in a database.

29. The method according to claim 28 further comprising analyzing said profile with a profile analyzer.

30. The method according to claim 29 further comprising analyzing information useful for generating offers as a function of trading history using said profile analyzer.

31. The method according to claim 29 further comprising using said profile analyzer to analyze said profile to determine whether trading transactions associated with said trading entity generated a profit.

32. A method comprising:
   acquiring a history of trading transactions made by one of a plurality of takers using a processor implemented at least partly in hardware, said taker being associated with an identifier;
   generating a profile of said taker based on said history of trading transactions using a processor implemented at least partly in hardware said profile indicating whether said trading transactions would generate a profit; and
   generating an offer to buy or to sell a trading item to an exchange to make a trade associated with said taker for a predetermined fee to be paid to said exchange using a processor implemented at least partly in hardware, wherein the exchange processes trading transactions for items having a bid/offer spread.

* * * * *